US008265816B1

(12) United States Patent
LaFrance

(10) Patent No.: US 8,265,816 B1
(45) Date of Patent: Sep. 11, 2012

(54) APPARATUS AND METHODS TO DISABLE AN ELECTRIC VEHICLE

(75) Inventor: Ryan Marc LaFrance, Marietta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/117,322

(22) Filed: May 27, 2011

(51) Int. Cl.
*H02J 7/00* (2006.01)
*G06F 7/04* (2006.01)

(52) U.S. Cl. ............ 701/22; 701/2; 320/109; 705/14.25

(58) Field of Classification Search ............ 701/22, 701/2; 320/104, 109, 108, 137; 705/14.25, 705/39; 709/246, 217
See application file for complete search history.

(56) References Cited

U.S. PATENT DOCUMENTS

| 6,850,153 | B1 | 2/2005 | Murakami et al. |
| 7,693,609 | B2 | 4/2010 | Kressner et al. |
| 7,844,370 | B2 | 11/2010 | Pollack et al. |
| 2004/0044452 | A1 | 3/2004 | Bauer et al. |
| 2007/0271015 | A1 | 11/2007 | Bauer et al. |
| 2008/0258890 | A1 | 10/2008 | Follmer et al. |
| 2009/0045675 | A1 | 2/2009 | Novak |
| 2009/0066287 | A1 | 3/2009 | Pollack et al. |
| 2009/0082916 | A1* | 3/2009 | Tanaka ............................. 701/22 |
| 2009/0085522 | A1* | 4/2009 | Matsumoto .................. 320/137 |
| 2009/0174365 | A1 | 7/2009 | Lowenthal et al. |
| 2009/0287578 | A1 | 11/2009 | Paluszek et al. |
| 2010/0010698 | A1 | 1/2010 | Iwashita et al. |
| 2010/0049639 | A1 | 2/2010 | Ferro et al. |
| 2010/0052882 | A1 | 3/2010 | Sverrisson et al. |
| 2010/0161481 | A1 | 6/2010 | Littrell |
| 2010/0194529 | A1 | 8/2010 | Yamamoto |
| 2010/0207588 | A1 | 8/2010 | Lowenthal et al. |
| 2010/0228405 | A1 | 9/2010 | Morgal et al. |
| 2010/0274656 | A1 | 10/2010 | Genschel et al. |
| 2011/0025556 | A1 | 2/2011 | Bridges et al. |
| 2011/0241824 | A1* | 10/2011 | Uesugi ............................ 340/5.8 |
| 2011/0302078 | A1* | 12/2011 | Failing ............................ 705/39 |
| 2012/0112697 | A1* | 5/2012 | Heuer et al. ................... 320/109 |

FOREIGN PATENT DOCUMENTS

| EP | 1394921 A2 | 3/2004 |
| WO | 2008150412 A1 | 12/2008 |
| WO | 2008157443 A2 | 12/2008 |

* cited by examiner

*Primary Examiner* — Tan Q Nguyen
(74) *Attorney, Agent, or Firm* — Global Patent Operation

(57) ABSTRACT

A security device for use with an electric vehicle is provided. The security device includes a processor that is programmed to receive at least one signal representative of a disconnection between a charging station and a battery within the electric vehicle. The processor is further programmed to generate a command signal based on the signal. Moreover, the security device includes a control module that is coupled to the processor, wherein the security device is configured to receive the command signal. The control module is also configured to transmit a control signal to lock the battery to render the electric vehicle inoperable when the disconnection between the charging station and the battery is performed by an unauthorized user.

20 Claims, 3 Drawing Sheets

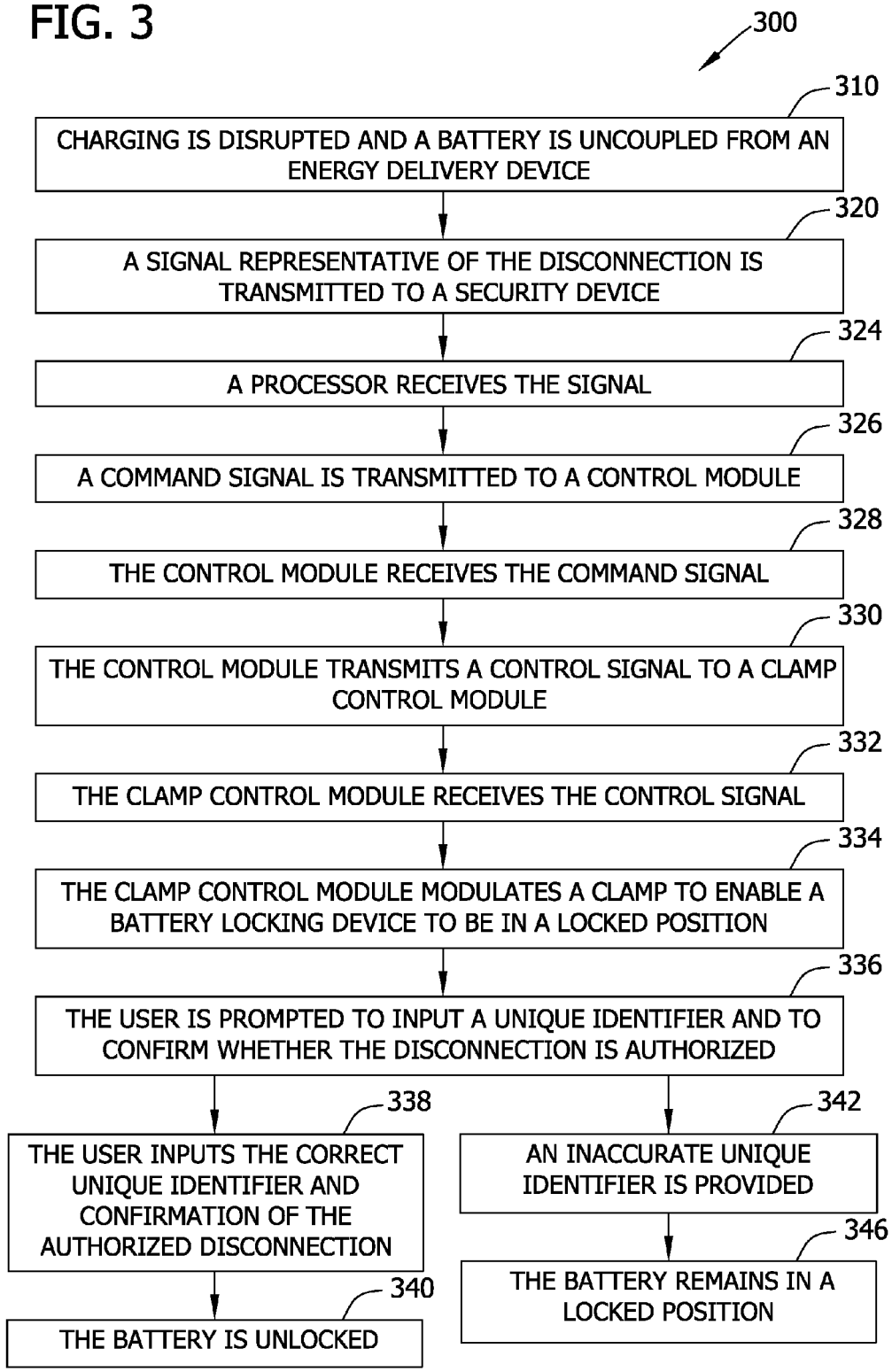

APPARATUS AND METHODS TO DISABLE AN ELECTRIC VEHICLE

BACKGROUND OF THE INVENTION

The field of the invention relates generally to electric vehicles and, more particularly, to a security device that disables an electric vehicle when the electric vehicle is unexpectedly disconnected from a charging station by an unauthorized user.

At least partially in response to increasing fuel costs related to the use of conventional combustion engine vehicles, the use of electric vehicles has increased. Accordingly, energy demand has increased in the form of electrical energy used to charge batteries or other energy sources used in such vehicles. Moreover, with an increase in the number of electric vehicles being used by consumers, the need for electric vehicle charging stations (EVCS) has increased throughout the world in order to provide energy to the electric vehicles.

With at least some known EVCS, a user can easily activate a unit at the station to start the flow of electrical energy into their electric vehicle by swiping a radio frequency identification (RFID) tag across a reader located on the unit. A charging time of an electric vehicle depends on various factors including, but not being limited to, environmental conditions, the size of the vehicle's battery, the charging level, the size of the charger for the battery, and/or the state of the charge of the battery when the vehicle is coupled to the EVCS. Depending on such factors, a typical charging time for an electric vehicle may be between approximately two hours to approximately eight hours in length. Because the charging process may be time-consuming, the user may leave the electric vehicle to perform other tasks and/or activities while the electric vehicle is charging. However, while the electric vehicle is left unattended to charge, a third party may attempt to disconnect the electric vehicle from the charging station in order to steal the electric vehicle.

BRIEF DESCRIPTION OF THE INVENTION

In one embodiment, a security device for use with an electric vehicle is provided. The security device includes a processor that is programmed to receive at least one signal representative of a disconnection between a charging station and a battery within the electric vehicle. The processor is further programmed to generate a command signal based on the signal. Moreover, the security device includes a control module that is coupled to the processor, wherein the security device is configured to receive the command signal. The control module is also configured to transmit a control signal to lock the battery to render the electric vehicle inoperable.

In another embodiment, an electric vehicle is provided. The electric vehicle includes a battery and a security device coupled to the battery. The security device includes a processor programmed to receive at least one signal representative of a disconnection between a charging station and the battery. The processor is further programmed to generate a command signal based on the signal. Moreover, the security device includes a control module that is coupled to the processor. The control module is configured to receive the command signal and configured to transmit a control signal to lock the battery to render the electric vehicle inoperable.

In yet another embodiment, a method to disable an electric vehicle is provided. The method includes receiving at least one signal representative of a disconnection between a charging station and a battery within the electric vehicle. A command signal is generated based on the signal. The command signal is transmitted to a control module. A control signal is transmitted, via the control module, to lock the battery to render the electric vehicle inoperable.

BRIEF DESCRIPTION OF THE DRAWINGS

FIG. 3 is a flow chart of an exemplary method to disable the electric vehicle shown in FIG. 1.

DETAILED DESCRIPTION OF THE INVENTION

The exemplary systems, apparatus, and methods described herein overcome at least some known disadvantages of known electric vehicles by providing a security device that enables a battery within an electric vehicle to be locked such that the electric vehicle is inoperable when the electric vehicle is unexpectedly disconnected from a charging station and/or disconnected from a charging station by an unauthorized user. More specifically, the embodiments described herein provide a security device for use with an electric vehicle. The security device includes a processor that receives at least one signal when charging station and a battery within the electric vehicle have been disconnected from each other. The processor is programmed to generate a command signal based on the signal. Moreover, the security device includes a control module that is coupled to the processor to receive the command signal. The control module transmits a control signal to lock the battery, and thus disable operation of the electric vehicle, when the disconnection between the charging station and the battery is unexpected and/or performed by an unauthorized user. Accordingly, a third party, such as an unauthorized user, is prevented from disconnecting the electric vehicle from the charging station in order to steal the electric vehicle.

Figure 1:
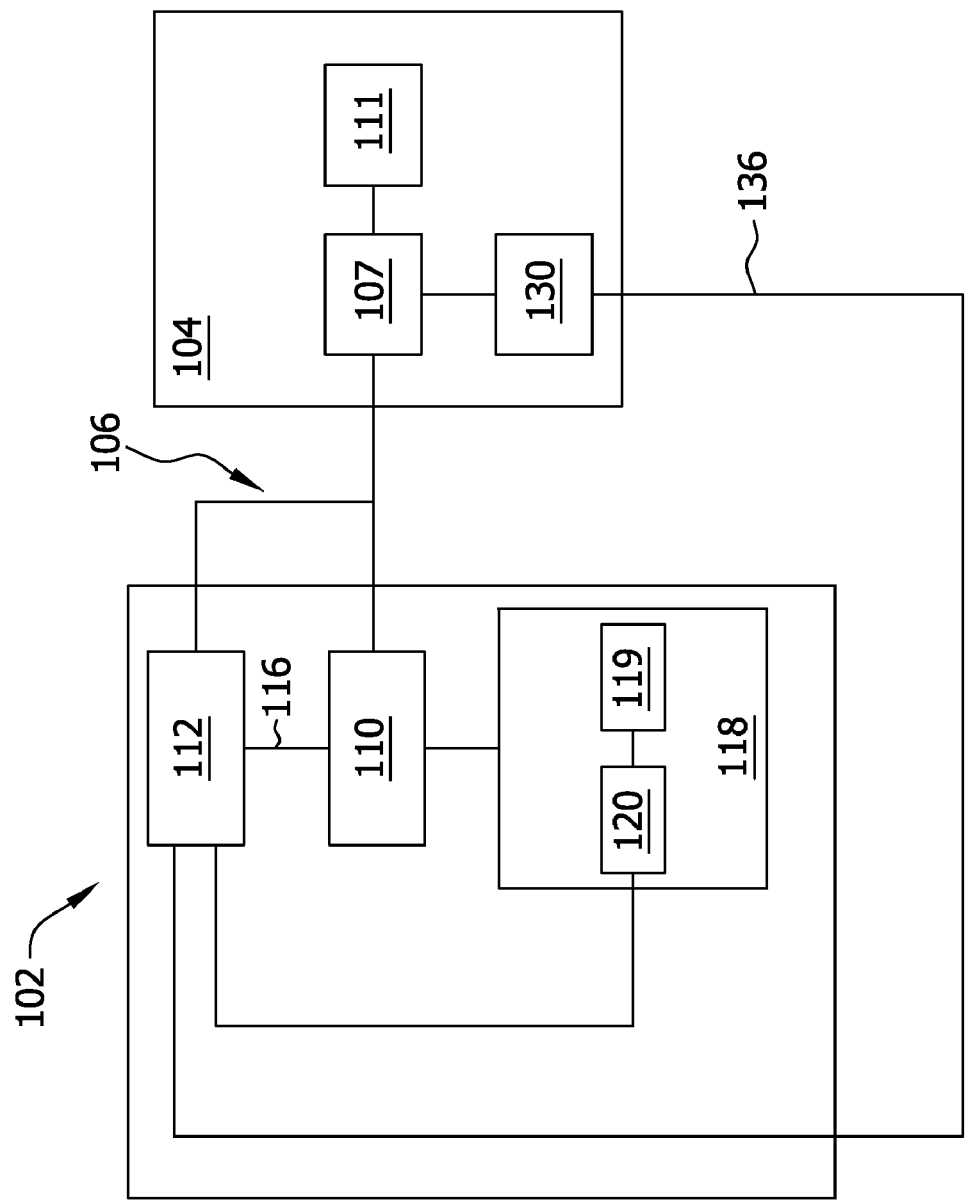
FIG. 1 is a block diagram of an exemplary electric vehicle.

FIG. 1 is a block diagram of an electric vehicle 102. It should also be noted that the term "electric vehicle" refers generally to a vehicle that includes one or more electric motors (not shown) that are used to provide propulsion to the vehicle. Energy, such as electrical energy, used to propel electric vehicles may come from various sources, such as, but not limited to, an on-board rechargeable battery and/or an on-board fuel cell. In one embodiment, the electric vehicle is a hybrid electric vehicle that captures and stores energy generated by braking. Moreover, a hybrid electric vehicle uses energy stored in an electrical source, such as a battery, to continue operating when idling to conserve fuel. Some hybrid electric vehicles are capable of recharging the battery by plugging into a power receptacle, such as a general power outlet. Another example of an electric vehicle is a fuel-cell vehicle, which uses only electrical energy for propulsion. Accordingly, the term "electric vehicle" as used herein may refer to a hybrid electric vehicle, a fuel-cell vehicle, or any other vehicle to which electrical energy may be delivered via a power grid.

In the exemplary embodiment, electric vehicle 102 is coupled to a charging station 104 via a conduit 106. Alternatively, electric vehicle 102 may be wirelessly coupled to charging station 104. It should be noted that, as used herein, the term "couple" is not limited to a direct mechanical, electrical, and/or communication connection between components, but may also include an indirect mechanical, electrical, and/or communication connection between multiple components.

Moreover, in the exemplary embodiment, electric vehicle 102 is coupled to an energy delivery device 107 that is included within electric vehicle charging station 104. Specifically, in the exemplary embodiment, a battery 110 within electric vehicle is coupled to energy delivery device 107 via conduit 106. Alternatively, battery 110 may be wirelessly coupled to energy delivery device 107. Moreover, in the exemplary embodiment, energy delivery device 107 is coupled to an energy source 111 to selectively supply energy, such as electrical energy, from energy source 111 to battery 110. Electric vehicle 102 stores the electrical energy in battery 110 and uses the stored electrical energy for propulsion, rather than, or in addition to, more conventional energy sources, such as gasoline. Moreover, in the exemplary embodiment, conduit 106 is fabricated from a metallic wire. Alternatively, conduit 106 may be fabricated from any other substance or compound that enables conduit 106 to deliver electrical energy to electric vehicle 102 and that enables charging station 104 to function as described herein. In the exemplary embodiment, battery 110 is a rechargeable lithium-ion battery 110. Alternatively, battery 110 may be any other lithium-based battery or any other type of battery that enables electric vehicle 102 to function as described herein. Moreover, in the exemplary embodiment, electric vehicle 102 includes a security device 112 coupled therein, and security device 112 is coupled to battery 110 via a conduit 116. Alternatively, security device 112 may be wirelessly coupled to battery 110. Moreover, in the exemplary embodiment, conduit 116 is fabricated from a metallic wire. Alternatively, conduit 116 may be fabricated from any other substance or compound that enables conduit 116 and/or electric vehicle 102 to function as described herein. Further, while security device 112 is coupled within electric vehicle 102 in the exemplary embodiment, it should be noted that security device 112 may be at another location. For example, security device 112 may be coupled within charging station 104. Security device 112 may even be in a cloud (not shown), such as a cloud computing system, or be located in a remote location.

Electric vehicle 102 also includes a battery immobilizing or locking device 118 that is coupled to battery 110. In the exemplary embodiment, locking device 118 includes a clamp 119 that enables locking device 118 to be selectively positioned in a locked or unlocked position (not shown). Moreover, in the exemplary embodiment, when locking device 118 is in a locked position, battery 110 is locked and disconnected within electric vehicle 102 such that electric vehicle 102 is inoperable and is disabled. When locking device 118 is in an unlocked position, battery 110 is unlocked and connected within electric vehicle 102 such that electric vehicle 102 is operable.

In the exemplary embodiment, battery locking device 118 is wirelessly coupled to security device 112. More specifically, in the exemplary embodiment, battery locking device 118 includes a clamp control module 120 that is coupled to security device 112. In the exemplary embodiment, security device 112 includes a control module (not shown in FIG. 1) that enables security device 112 to send a control signal to module 120. The control signal enables the modulation of clamp 119, via module 120, to change positions such that locking device 118 may be selectively positioned in either a locked or unlocked position.

Moreover, in the exemplary embodiment, charging station 104 includes a network interface 130 that couples to a network 136 to enable communication with security device 112. For example, network 136 enables security device 112 to communicate to charging station 104 whether battery 110 is connected and/or disconnected from energy deliver device 107 and/or when battery 110 is disconnected from energy delivery device 107 prior to a complete charge of battery 110. Moreover, in the exemplary embodiment, network 136 enables security device 112 to communicate a charging status of battery 110, such as the amount of electrical charge that is received by battery 110, to charging station 104. Similarly, when the charging of battery 110 is complete, a signal representative of the completed charge is transmitted to charging station 104. In the exemplary embodiment, network 136 may include, but is not limited to only including, the Internet, a local area network (LAN), a wide area network (WAN), a wireless LAN (WLAN), a mesh network, and/or a virtual private network (VPN). Moreover, in the exemplary embodiment, security device 112 is coupled to charging station 104 via network 136. In the exemplary embodiment, charging station 104 may communicate with security device 112 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of the Institute of Electrical and Electronics Engineers, Inc., of New York, N.Y.

During operation, when a charge of electric vehicle battery 110 is below a desired charge level, a user may take electric vehicle 102 to charging station 104 and couple battery 110 to energy delivery device 107. Charging station 104 then transmits a signal indicative of a connection between energy delivery device 107 and battery 110 to security device 112. Security device 112 prompts the user to input a unique identifier, such as a username and/or a password, and after the user providing the unique identifier, the user is prompted to confirm receiving a charge for battery 110. After receiving confirmation, electrical energy is transmitted from energy delivery device 107 to battery 110 via conduit 106. When the charging of battery 110 is complete, a signal representative of the completed charge is transmitted to charging station 104 via security device 112.

In the exemplary embodiment, if charging is disrupted and/or battery 110 is uncoupled from energy delivery device 107 prior to a complete charge of battery 110, a signal representative of the disconnection between battery 110 and energy delivery device 107 is transmitted from charging station 104 to security device 112. Security device 112 then transmits a control signal to battery locking device 118. More specifically, security device 112 transmits a control signal to clamp control module 120 causing clamp 119 to be modulated such that battery locking device 118 is moved to a locked position. The locked position renders battery 110 to be locked such that battery 110 is disconnected from electric vehicle 102, and electric vehicle 102 is inoperable.

Security device 112 prompts the user to confirm the unique identifier previously provided by the user and to confirm whether the disconnection between battery 110 and energy deliver device 107 is authorized. If the unique identifier is accurate and the disconnection is authorized, the user can continue using electric vehicle 102 as before. More specifically, when security device 112 receives the accurate unique identifier, then security device 112 transmits a control signal to clamp control module 120 that causes clamp 119 to be modulated such that battery locking device 118 is moved to an unlocked position. The unlocked position enables battery 110 to connect within electric vehicle 102 such that electric vehicle 102 is operable.

If, however, upon such a detection of a disconnection between battery 110 and charging station 104, a third party, such as an unauthorized user, is performing the disconnection between battery 110 and charging station 104, then an inaccurate unique identifier is provided and/or no identifier is provided. Battery locking device 118 will then remain in a locked position. As such, battery 110 is locked when the disconnection between battery 110 and charging station 104 is an unexpected disconnection and/or a disconnection performed by an unauthorized user.

An authorized user can later input an accurate unique identifier into security device 112 and couple battery 110 to energy delivery device 107. More specifically, when security device 112 receives the accurate unique identifier and a signal from charging station 104 of the reconnection between battery 110 and energy delivery device 107, then security device 112 transmits a control signal to clamp control module 120 that causes clamp 119 to be modulated such that battery locking device 118 is moved to an unlocked position. The unlocked position enables battery 110 to connect within electric vehicle 102 such that electric vehicle 102 is operable. Accordingly, as compared to at least some known electric vehicles, by using security device 112, electric vehicle 102 may be selectively disabled to prevent a third party, such as an unauthorized user, from disconnecting electric vehicle 102 from charging station 104 in order to steal electric vehicle 104.

Figure 2:
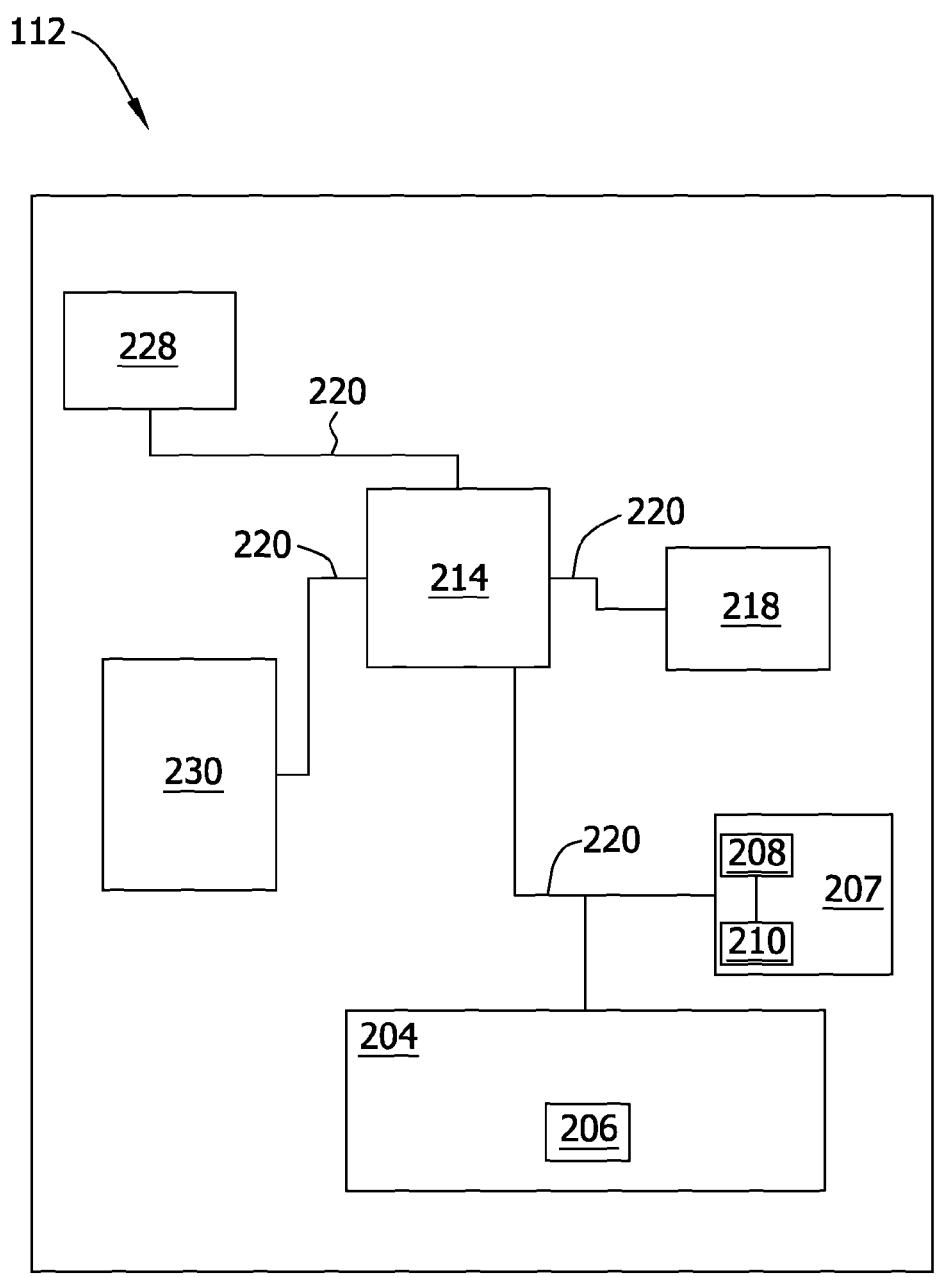
FIG. 2 is a block diagram of an exemplary security device that may be used with the electric vehicle shown in FIG. 1.

FIG. 2 is a block diagram of security device 112 that is coupled within electric vehicle 102 (shown in FIG. 1). In the exemplary embodiment, security device 112 includes a user interface 204 that receives at least one input from a user (not shown). In the exemplary embodiment, user interface 204 includes a keyboard 206 that enables a user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone). While security device 112 includes a user interface 204, it should be noted that charging station 104 may also include a user interface (not shown) that receives at least one input from the user.

Moreover, in the exemplary embodiment, security device 112 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Security device 112 also includes a processor 214 and a memory device 218. In the exemplary embodiment, processor 214 is coupled to user interface 204, to presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218. The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 is one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by the user via user interface 204, information received from other components of electric vehicle 102 and/or information received from charging station 104 (shown in FIG. 1).

Security device 112, in the exemplary embodiment, also includes a control module 228 and a communication interface 230 that are each coupled to processor 214 via system bus 220. Moreover, in the exemplary embodiment, control module 228 is wirelessly coupled to battery locking device 118 (shown in FIG. 1). Alternatively, control module 228 may be coupled, via a wire, to battery locking device 118. More specifically, control module 228 is coupled to clamp control module 120 (shown in FIG. 1). Moreover, in the exemplary embodiment, communication interface 230 is communicatively coupled to charging station 104 via network 136 (shown in FIG. 1). In the exemplary embodiment, communication interface 230 communicates with charging station 104 and/or other components of electric vehicle 102.

During operation, when a charge of electric vehicle battery 110 is below a desired charge level, a user may take electric vehicle 102 to charging station 104 and couple battery 110 to energy delivery device 107 (shown in FIG. 1). Charging station 104 then transmits a signal representative of the connection between energy delivery device 107 and battery 110 to security device 112. More specifically, security device 112 receives the signal via communication interface 230. Communication interface 230 transmits the signal to processor 214 and to memory device 218. Processor 214 then prompts the user, via presentation interface 207, to provide a unique identifier, such as a username and/or a password. The user may then input the unique identifier via user interface 204. Alternatively, the user may input the unique identifier via a user interface (not shown) that may be coupled within charging station 104.

After receiving the unique identifier, processor 214 prompts the user, via presentation interface 207 to confirm receiving a charge for battery 110. When the user confirms receiving a charge for battery, processor 214, via communication interface 230, transmits a signal to charging station 104, and electrical energy is transmitted from energy delivery device 107 to battery 110 via conduit 106 (shown in FIG. 1). When charging is complete, a signal representative of the completed charge is transmitted to charging station 104 via security device 112.

In the exemplary embodiment, if charging is disrupted and/or battery 110 is uncoupled from energy delivery device 107 prior to a complete charge of battery 110, a signal representative of the disconnection between battery 110 and energy delivery device 107 is transmitted from charging station 104 to security device 112. More specifically, security device 112 receives the signal via communication interface 230. Communication interface 230 transmits the signal to processor 214 and to memory device 218. Processor 214 transmits a command signal to control module 228, wherein the command signal is representative of a command to lock battery 110. When control module 228 receives the command signal, control module 228 transmits a control signal to clamp control module 120 (shown in FIG. 1), wherein the control signal is representative of a modulation of clamp 119 to enable battery locking device 118 to be in a locked position. When clamp control module 120 receives the control signal, module 120 modulates clamp 119 to enable battery locking device 118 to be in a locked position. The locked position renders battery 110 to be locked such that battery 110 is disconnected from electric vehicle 102, and electric vehicle 102 is inoperable.

Processor 214 transmits a signal to presentation interface 207 to prompt the user to input the unique identifier previously provided by the user and to confirm whether the disconnection between battery 110 and energy deliver device 107 is authorized. If the disconnection is authorized, the user may input, via user interface 204, the correct unique identifier and confirmation of the authorized disconnection. When processor 214 receives the correct unique identifier and the confirmation of the authorized disconnection, processor 214 will then verify the unique identifier. When the unique identifier is verified, processor 214 will transmit a command signal to control module 228, wherein the command signal is representative of a command to unlock battery 110. When control module 228 receives the command signal, control module 228 transmits a control signal to clamp control module 120 such that module 120 causes clamp 119 to be modulated such that battery locking device 118 is moved in an unlocked position. The unlocked position enables battery 110 to connect within electric vehicle 102 such that electric vehicle 102 is operable.

If, however, upon such a detection of a disconnection between battery 110 and charging station 104, a third party, such as an unauthorized user, is performing the disconnection between battery 110 and charging station 104, then an inaccurate unique identifier is provided and/or no identifier is provided. Then processor 214 is unable to verify the unique identifier and battery 110 will remain in a locked position. As such, battery 110 is locked when the disconnection between battery 110 and charging station 104 is an unexpected disconnection and/or a disconnection performed by an unauthorized user.

An authorized user can later input, via user interface 204, the correct unique identifier into security device 112 and couple battery 110 to energy delivery device 107. During this time, charging station 104 transmits a signal representative of the connection between battery 110 and energy delivery device 107 to security device 112. More specifically, communication interface 230 will receive the signal and transmit the signal to processor 214 and memory device 218. When processor 214 receives the correct unique identifier and the signal from charging station 104 of the reconnection between battery 110 and energy delivery device 107, processor 214 will then verify the unique identifier. When the unique identifier is verified, processor 214 will transmit a command signal to control module 228, wherein the command signal is representative of a command to unlock battery 110. When control module 228 receives the command signal, control module 228 transmits a control signal to clamp control module 120 such that module 120 causes clamp 119 to be modulated such that battery locking device 118 is moved in an unlocked position. The unlocked position enables battery 110 to connect within electric vehicle 102 such that electric vehicle 102 is operable.

FIG. 3 is a flow chart of an exemplary method 300 that may be used to selectively disable an electric vehicle, such as electric vehicle 102 (shown in FIG. 1), using a security device, such as security device 112 (shown in FIGS. 1 and 2). In the exemplary embodiment, if charging is disrupted 310 and a battery 110 (shown in FIG. 1) is uncoupled from energy delivery device 107 prior to a complete charge of battery 110, a signal representative of the disconnection between battery 110 and energy delivery device 107 is transmitted 320 from a charging station 104 (shown in FIG. 1) to security device 112. More specifically, a processor 214 (shown in FIG. 2) receives 324 the signal from communication interface 230. A command signal is transmitted 326 by processor 214 to a control module 228 (shown in FIG. 2), wherein the command signal is representative of a command to lock battery 110. When control module 228 receives 328 the command signal, control module 228 transmits 330 a control signal to a clamp control module 120 (shown in FIG. 1), wherein the control signal causes a battery locking device 118 (shown in FIG. 1) to be moved to a locked position. Specifically, when clamp control module 120 receives 332 the control signal, module 120 modulates 334 clamp 119 to enable battery locking device 118 to be in a locked position. The locked position renders battery 110 to be locked such that battery 110 is disconnected from electric vehicle 102, and electric vehicle 102 is disabled.

The user of electric vehicle 102 is prompted 336 to input a unique identifier and to confirm whether the disconnection between battery 110 and energy delivery device 107 is authorized. If the disconnection is authorized, the user inputs 338 the correct unique identifier and confirmation of the authorized disconnection. Battery 110 is unlocked 340 and the user may continue using electric vehicle 102 as described above. If, however, a third party, such as an unauthorized user, is performing the disconnection between battery 110 and charging station 104, then an inaccurate unique identifier is provided 342. Battery 110 will remain 346 in a locked position and an authorized user may later unlock battery 110 as described above.

As compared to known electric vehicles, the above-described embodiments provide a user of an electric vehicle with a security device that enables a battery within an electric vehicle to be selectively locked such that the electric vehicle is disabled and inoperable when the electric vehicle is unexpectedly disconnected from a charging station and/or the disconnection is by an unauthorized user. More specifically, the embodiments described herein provide a security device for use with an electric vehicle. The security device includes a processor that receives at least one signal representative of a disconnection between a charging station and a battery within the electric vehicle. The processor generates a command signal based on the signal. Moreover, the security device includes a control module that is coupled to the processor. The control module receives the command signal and transmits a control signal to lock the battery such that the electric vehicle is inoperable when the disconnection between the charging station and the battery is unexpected and/or performed by an unauthorized user. Accordingly, a third party, such as an unauthorized user, is prevented from disconnecting the electric vehicle from the charging station in order to steal the electric vehicle.

A technical effect of the apparatus, systems, and methods described herein includes at least one of: (a) receiving at least one signal representative of a disconnection between a charging station and a battery within an electric vehicle; (b) generating a command signal based on at least one signal; (c) transmitting a command signal to a control module; and (d) transmitting a control signal via a control module to lock a battery to render an electric vehicle inoperable when a disconnection between a charging station and a battery.

Exemplary embodiments of systems, apparatus, and methods for use in disabling an electric vehicle are described above in detail. The systems, apparatus, and methods are not limited to the specific embodiments described herein, but rather, components of each system and/or steps of each method may be utilized independently and separately from other components and/or steps described herein. For example, each system may also be used in combination with other systems and methods, and is not limited to practice with only systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A security device for use with an electric vehicle, said security device comprising:
   a processor programmed to receive at least one signal representative of a disconnection between a charging station and a battery within the electric vehicle, said processor further programmed to generate a command signal based on the at least one signal; and
   a control module coupled to said processor and configured to receive the command signal, said control module further configured to transmit a control signal to lock the battery to render the electric vehicle inoperable.

2. A security device in accordance with claim 1, further comprising a communication interface coupled to said processor and configured to receive the at least one signal representative of the disconnection.

3. A security device in accordance with claim 1, wherein the command signal generated by said processor is representative of a command to lock the battery when the disconnection between the charging station and the battery is at least one of an unexpected disconnection and performed by an unauthorized user.

4. A security device in accordance with claim 1, further comprising a user interface configured to receive at least one input from a user of the electric vehicle, wherein the at least one input includes a unique identifier.

5. A security device in accordance with claim 4, wherein the at least one unique identifier includes at least one of a username and a password.

6. A security device in accordance with claim 1, wherein said processor is programmed to verify at least one unique identifier received by a user, wherein the command signal generated by said processor is representative of a command to lock the battery when the at least one unique identifier is not verifiable.

7. A security device in accordance with claim 6, wherein the command signal generated by said processor is representative of a command to unlock the battery when the at least one unique identifier is verifiable.

8. An electric vehicle comprising:
   a battery; and
   a security device coupled to said battery, said security device comprising:
     a processor programmed to receive at least one signal representative of a disconnection between a charging station and said battery, said processor further programmed to generate a command signal based on the at least one signal; and
     a control module coupled to said processor for receiving the command signal, said control module configured to transmit a control signal to lock said battery to render said electric vehicle inoperable.

9. An electric vehicle in accordance with claim 8, wherein said security device further comprises a communication interface coupled to said processor and configured to receive the at least one signal representative of the disconnection.

10. An electric vehicle in accordance with claim 9, wherein the command signal generated by said processor is representative of a command to lock said battery when the disconnection between the charging station and the battery is at least one of an unexpected disconnection and performed by an unauthorized user.

11. An electric vehicle in accordance with claim 8, wherein said security device further comprises a user interface configured to receive at least one input from a user of said electric vehicle, wherein the at least one input includes at least one unique identifier.

12. An electric vehicle in accordance with claim 11, wherein the at least one unique identifier includes at least one of a username and a password.

13. An electric vehicle in accordance with claim 8, wherein said processor is programmed to verify at least one unique identifier received by a user, the command signal generated by said processor is representative of a command to lock the battery when the at least one unique identifier is not verifiable.

14. An electric vehicle in accordance with claim 13, wherein the command signal generated by said processor is representative of a command to unlock the battery when the at least one unique identifier is verifiable.

15. A method to disable an electric vehicle, said method comprising:
   receiving at least one signal representative of a disconnection between a charging station and a battery within the electric vehicle;
   generating a command signal based on the at least one signal;
   transmitting the command signal to a control module; and
   transmitting a control signal via the control module to lock the battery to render the electric vehicle inoperable.

16. A method in accordance with claim 15, wherein generating a command signal further comprises generating a command signal that is representative of a command to lock the battery when the disconnection between the charging station and the battery is at least one of an unexpected disconnection and performed by an unauthorized user.

17. A method in accordance with claim 15, further comprising receiving at least one input from a user of the electric vehicle.

18. A method in accordance with claim 17, wherein receiving at least one input further comprises receiving at least one unique identifier from the user.

19. A method in accordance with claim 18, further comprising:
   verifying the at least one unique identifier; and
   generating a command signal representative of a command to unlock the battery when the at least one unique identifier is verified.

20. A method in accordance with claim 18, wherein receiving at least one unique identifier further comprises receiving at least one of a username and a password.

* * * * *